Sept. 8, 1953      H. E. SALZMAN      2,651,050
FITTING FOR FLUSH TANKS
Filed March 7, 1950      2 Sheets-Sheet 1
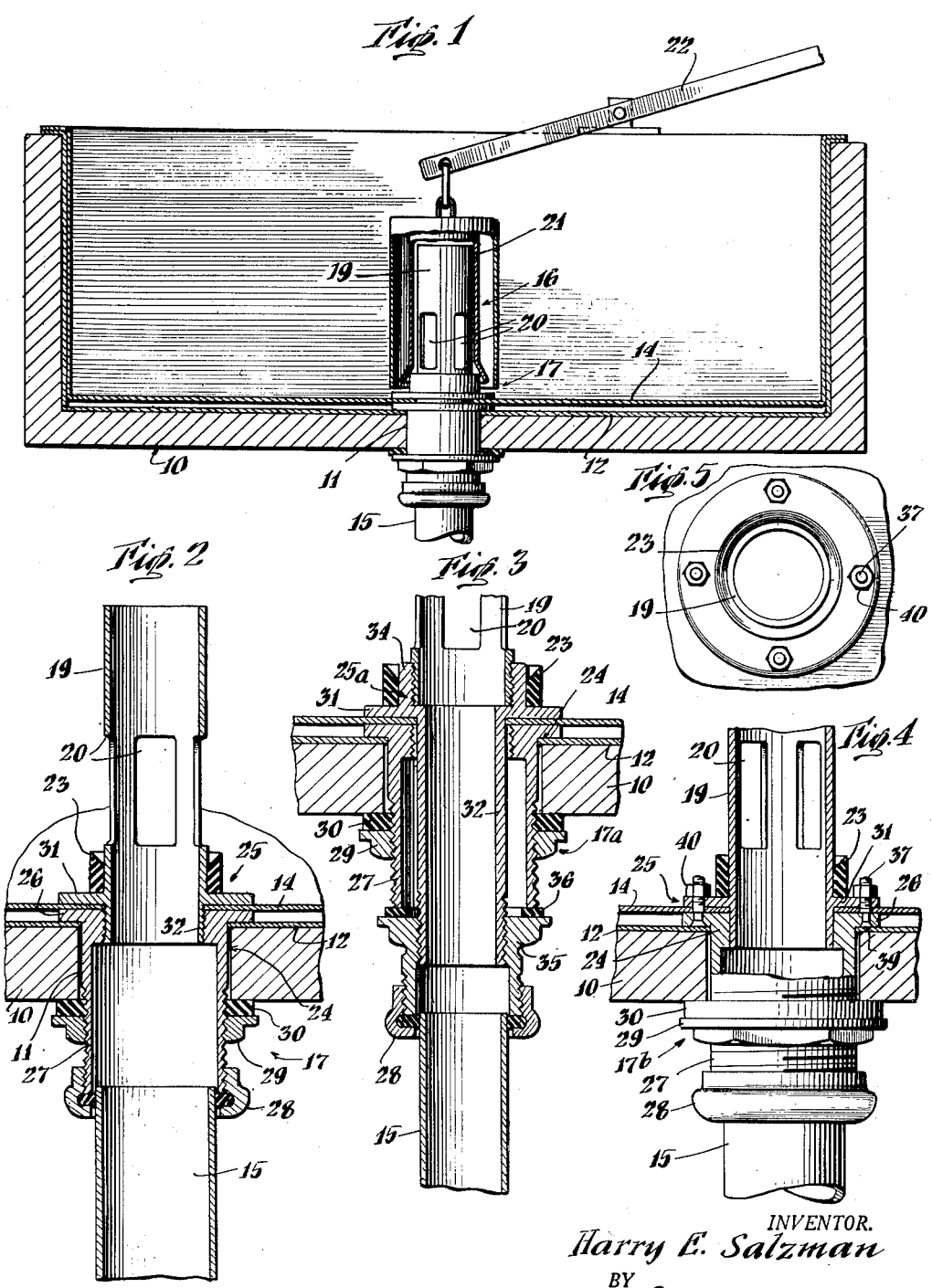
INVENTOR.
Harry E. Salzman
BY
Leo C. Krazinski
ATTORNEY Sept. 8, 1953     H. E. SALZMAN     2,651,050
FITTING FOR FLUSH TANKS
Filed March 7, 1950     2 Sheets-Sheet 2
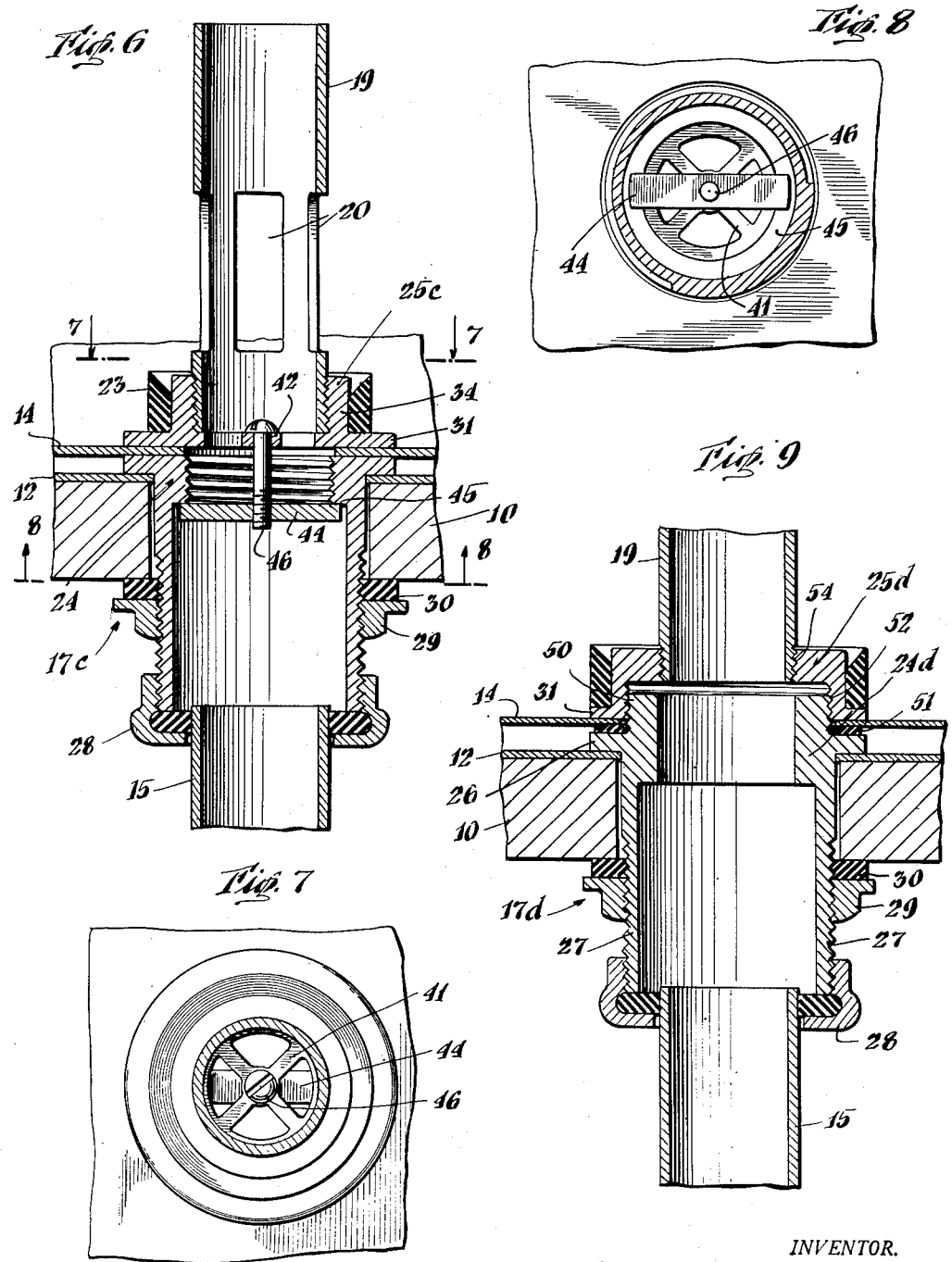
INVENTOR.
Harry E. Salzman
BY Les C. Krazinski
ATTORNEY Patented Sept. 8, 1953

2,651,050

UNITED STATES PATENT OFFICE 2,651,050

FITTING FOR FLUSH TANKS

Harry E. Salzman, Bronx, N. Y.

Application March 7, 1950, Serial No. 148,057

1 Claim. (Cl. 4—68)

The present invention relates to tanks for containing liquid, such as flush tanks and the like, and, more particularly, relates to improvements in outlet fittings for such tanks.

Heretofore it has been customary to line wooden flush tanks with a copper lining or the like, which had an opening in registry with the outlet opening of the tank; and to provide a fitting comprising a flange engaging the portion of the lining surrounding its opening and a tubular section extending through the lining and tank openings to which a collar was secured to cause the flange to seal the lining and tank openings and to which an outlet pipe was secured. In the event the lining corroded to cause the same to leak, the usual practice was to remove the fitting, position a new lining in the tank, and then replace the fitting. In order to accomplish this, the outlet pipe and fitting had to be disconnected, which operation frequently resulted in difficulty, particularly in view of the fact that the fitting and securing nut had been painted and repainted several times, so that often the tank itself was fractured while attempting to remove the nut.

Consequently, the usual procedure of distributing this connection has been dreaded by workmen because an apparently simple job often was attended by complications necessitating a great deal of unexpected work involving the replacement of a section of the outlet pipe, the entire outlet fitting, and, at times, the entire tank.

Accordingly, an object of the present invention is to provide a tank outlet structure which overcomes the foregoing difficulties and objections.

Another object is to provide such outlet structure which facilitates relining the tank in a convenient manner.

Another object is to provide tank outlet fittings which are simple and economical in construction and are readily assembled and taken apart.

A further object is to provide such fittings which accommodate a second tank lining without removal of the first lining.

A still further object is to provide such fittings which form a leak proof connection at the tank outlet opening.

Other and further objects will be obvious upon an understanding of the illustrative embodiment about to be described, or will be indicated in the appended claim, and various advantages not referred to herein will occur to one skilled in the art upon employment of the invention in practice.

In accordance with the invention, the foregoing objects are accomplished by providing a fitting which is adapted to extend through the tank outlet opening and has a flange facing the portion of the tank wall surrounding the opening, means for securing the fitting to the tank, a second fitting having a flange overlying the flange of the first fitting, and means for removably securing the first and second fittings, whereby the flanges are drawn together. In this manner the flange of the first fitting serves to seal the original lining about the tank outlet opening and need not be removed when it is desired to place a new lining in the tank, since only the second fitting need be removed, after which the new lining is placed in the tank, and the second fitting replaced to secure the new lining between the flanges of the fittings.

It will be understood from the embodiments of the invention about to be described that such connection of the first fitting to the tank and connection of the second fitting for cooperation with the first fitting may be accomplished in a number of ways.

A preferred embodiment of the invention has been chosen for purposes of illustration and description as is shown in the accompanying drawing, forming a part of the specification, wherein:

Fig. 1 is a sectional view of a relined flush tank provided with an outlet connection, in accordance with the invention, which is shown in elevation.

Fig. 2 is an enlarged fragmentary sectional view of the outlet connection shown in Fig. 1.

Fig. 3 is an enlarged fragmentary sectional view illustrating another embodiment of the invention.

Fig. 4 is an enlarged fragmentary sectional view illustrating still another embodiment of the invention.

Fig. 5 is a plan view of the structure shown in Fig. 4.

Fig. 6 is an enlarged fragmentary sectional view illustrating a further embodiment of the invention.

Fig. 7 is a sectional view taken along the line 7—7 of Fig. 6.

Fig. 8 is a sectional view taken along the line 8—8 on Fig. 6.

Fig. 9 is an enlarged fragmentary sectional view illustrating still a further embodiment of the invention.

Referring now to the drawings in detail and more particularly to Fig. 1 thereof, there is shown a rectangular flush tank comprising an outer tank structure 10, usually formed of wood, and having an outlet opening 11, in the bottom wall thereof, an original lining 12 for containing water but which has sprung a leak and required replacement, a second lining 14 positioned over the first lining which now contains the water, an outlet pipe 15, a valve 16 for controlling the outlet, and an outlet connection 17 in accordance with the invention.

The valve 16 is of conventional construction and comprises a tubular upright section 19 formed with outlet ports 20, a sleeve 21 slidably disposed about the section 19 for normally closing the ports 20, and valve operating mechanism, such as a pivoted pull chain operated lever 22 for lifting the sleeve to open the ports. A tubular gasket 23 surrounds the section 19 below the ports 20 and is adapted to cooperate with the lower end of the sleeve 21 to seal the ports.

The outlet connection 17 is illustrated in detail in Fig. 2, and comprises a pair of fittings 24 and 25, the fitting 25 being formed with the tubular section 19 as an integral part thereof, and means for securing the fittings as about to be described.

The fitting 24 has an outwardly extending flange 26 at its upper end for engaging the portion of the old lining 12 surrounding the tank opening 11, and has a tubular shank or nipple portion 27 extending downwardly through the tank opening and being exteriorly threaded at its lower end. A screw ring 29 is screwed on the shank portion 27 and serves as means for securing the fitting 24 to the tank, so that the flange 26 seals the lining 12 at the tank outlet opening 11; and a gasket 30 is disposed between the lower outer wall of the tank and the screw ring to provide a fluid tight connection at the lower end of the tank outlet opening.

The outlet pipe 15 is connected to the lower end of the fitting portion 27 by a coupling 28, as shown.

The fitting 25 has a flange 31 overlying the flange 26 with the lining 14 being disposed between the flanges, and has a shank or nipple portion 32 threaded into the upper interior end of the fitting 24 which serves as means for removably securing the fittings 24 and 25 and drawing the flanges 26 and 31 thereof together to form a seal about the lining 14 at its outlet opening.

The foregoing described outlet connection can be advantageously utilized by initially installing the same in a tank having only the original lining 12, the fitting 25 being secured to the fitting 24 with the flanges 26 and 31 being in contact with each other. In the event the lining 12 springs a leak which cannot be repaired and would otherwise than provided for herein require replacement thereof, the fitting 25 is unscrewed, a new lining 14 is positioned within the old defective lining, and the fitting 25 is reapplied as shown in Fig. 2. This is all accomplished without requiring removal of the lining 12 and the fitting 24 and disturbance of the outlet pipe 15. It is, of course, understood that the new lining 14 may be of the same material as the original lining 12, usually of copper, or the new lining may be of suitable plastic material.

In Fig. 3, a modified connection 17a is shown which differs essentially from the connection 17 shown in Fig. 2 in that the fitting 25a comprises an upper collar section 34 in which the section 19 is threaded, and, a somewhat longer shank portion 32 which extends downwardly and outwardly beyond the portion 27 of the fitting 24 and is exteriorly threaded at its lower end. A nipple 35 is screwed about the lower end of the portion 32 which secures a sealing gasket 36 against the lower end of the portion 27 and which causes the flanges 26 and 31 to be drawn together. The coupling 28 is secured about the lower end of the nipple 35.

In Figs. 4 and 5, another connection 17b is shown which is essentially the same as the connection 17 shown in Fig. 2, except that the means for removably securing and drawing the flanges together is modified. As shown, the flanges 26 and 31 have registering apertures through which screws 37 extend. These screws have heads 39 positioned in a counter-sunk portion of the apertures of the flange 26 to irremovably mount the same when the fitting 24 is secured to the tank. The upper ends of the screws extend upwardly through the apertures of the flange 31 and nuts 40 are removably secured thereto.

In Figs. 6, 7, and 8, another connection 17c is shown which comprises a fitting 24, screw ring 29, gasket 30 and coupling 28, as shown in Fig. 2, and a somewhat modified fitting 25c.

The fitting 25c comprises a flange 31, a collar 34 in which the section 19 is threaded, and an internal spider 41 formed with a central aperture 42. The fittings 24 and 25c are removably secured by a bar 44 engaging an internal shoulder 45 of the fitting 24 and a screw 46 extending through the aperture 42 of the spider and threaded into the bar 44, which may be a free member or integral with the shoulder 45.

In Fig. 9, still another connection 17d is shown wherein the fittings 24d and 25d are somewhat modified.

The fitting 24d is essentially the same as the fitting 24 shown in Figs. 2 to 6 except that it is provided with an exteriorly threaded nipple portion 50 above its flange 26 and that a gasket 51 extends about this portion and is seated on the flange.

The fitting 25d comprises a flange 31 for cooperation with the flange 26, as previously described, a lower interiorly threaded bore 52 adapted to be screwed onto the portion 50 for removably securing the fittings, and an upper interiorly threaded bore 54 for receiving the section 19.

From the foregoing description, it will be seen that the present invention provides tank outlet connections which comprise simple and readily manufactured parts whereby the relining of tanks is greatly facilitated. The fittings utilized for accomplishing this are installed with the original tank lining and stand by in readiness for use in relining the tank whenever this contingency should occur.

As various changes may be made in the form, construction and arrangement of the parts herein, without departing from the spirit and scope of the invention and without sacrificing any of its advantages, it is to be understood that all matters are to be interpreted as illustrative and not in any limiting sense.

What is claimed is:

In combination with a tank for containing liquid having an outlet opening in a wall thereof and having a lining abutting said wall, said lining being permanently secured in the tank and having an opening in registry with the tank opening, a fitting having a flange engaging the portion of the lining surrounding its opening and having a cylindrical, tubular section extending freely through the tank and lining openings, said tubular section having internal threads adjacent said flange, threaded means for securing said fitting to the tank, a second lining spaced from said first lining removably mounted in said tank having an opening substantially in registry with the tank and first lining openings and having the portion at one side thereof surrounding its opening in engagement with said flange, a second fitting having a flange engaging the portion of the second lining surrounding its opening at the other side thereof, and an exteriorly threaded extension on said second fitting in mesh engagement with said interiorly threaded tubular section for removably securing said first and second fittings to cause said second lining to be secured between said flanges.

HARRY E. SALZMAN.

References Cited in the file of this patent

UNITED STATES PATENTS

| Number | Name | Date |
|---|---|---|
| 542,061 | Luff | July 2, 1895 |
| 869,953 | Willms | Nov. 5, 1907 |
| 1,092,579 | Kohler | Apr. 7, 1914 |
| 1,266,948 | Holt | May 21, 1918 |
| 2,025,814 | Goss | Dec. 31, 1935 |
| 2,284,416 | Gordon | May 26, 1942 |
| 2,395,606 | Zinkil et al. | Feb. 26, 1946 |

FOREIGN PATENTS

| Number | Country | Date |
|---|---|---|
| 68,329 | Germany | Apr. 29, 1893 |